(12) United States Patent
Brandner et al.

(10) Patent No.: US 7,681,736 B2
(45) Date of Patent: Mar. 23, 2010

(54) VACUMAG MAGNETIC SEPARATOR AND PROCESS

(75) Inventors: Edward D. Brandner, Mount Pleasant, PA (US); Russell E. Jamison, Lower Burrell, PA (US)

(73) Assignee: EXPORTech Company, Inc., Pittsburgh, PA (US)

( * ) Notice: Subject to any disclaimer, the term of this patent is extended or adjusted under 35 U.S.C. 154(b) by 433 days.

(21) Appl. No.: 11/248,941

(22) Filed: Oct. 11, 2005

(65) Prior Publication Data

US 2006/0096894 A1 May 11, 2006

Related U.S. Application Data

(60) Provisional application No. 60/618,402, filed on Oct. 13, 2004.

(51) Int. Cl.
*B03C 1/00* (2006.01)
(52) U.S. Cl. .................. 209/218; 209/39; 209/214; 209/232
(58) Field of Classification Search ............ 209/39, 209/147, 214, 218, 232
See application file for complete search history.

(56) References Cited

U.S. PATENT DOCUMENTS

| | | | | | |
|---|---|---|---|---|---|
| 2,203,959 | A | * | 6/1940 | Hammack | 209/137 |
| 2,591,121 | A | * | 4/1952 | Blind | 209/223.2 |
| 3,756,401 | A | * | 9/1973 | Rosner | 209/39 |
| 3,794,251 | A | * | 2/1974 | Williams | 241/65 |
| 3,901,795 | A | * | 8/1975 | Smith et al. | 209/39 |
| 4,242,197 | A | * | 12/1980 | Voelskow et al. | 209/3 |
| 4,342,647 | A | * | 8/1982 | McMillan et al. | 241/19 |
| 5,358,121 | A | * | 10/1994 | Robak et al. | 209/137 |
| 5,899,320 | A | * | 5/1999 | Miyasaka | 198/789 |
| 6,863,152 | B1 | * | 3/2005 | Sahyoun | 181/157 |
| 6,863,512 | B2 | * | 3/2005 | Dubelsten et al. | 425/83.1 |
| 7,051,880 | B1 | * | 5/2006 | Bills | 209/147 |
| 2006/0096894 | A1 | * | 5/2006 | Brandner et al. | 209/127.1 |

* cited by examiner

*Primary Examiner*—Patrick H Mackey
*Assistant Examiner*—Terrell H Matthews
(74) *Attorney, Agent, or Firm*—Ansel M. Schwartz

(57) ABSTRACT

An apparatus for separating a stream of particles with individual sizes smaller than 300 μm and magnetic properties ranging from collective magnetism as in ferromagnetism to paramagnetism to diamagnetism. The apparatus includes a plurality of stages for separating a stream of particles. The apparatus includes a magnetic component producing a magnetic force associated with each stage. The apparatus includes an aerodynamic component producing an aerodynamic force associated with each stage, where the more magnetic component or components of a feed of particles for each stage is separated and either or both the less magnetic product and the more magnetic product of each stage are the feed for separate succeeding stages with each stage and where the magnetic and aerodynamic forces along with gravimetric forces of each stage are chosen to separate more strongly magnetic particles from less magnetic particles.

A method for separating a stream of particles with individual sizes smaller than 300 μm and magnetic properties ranging from collective magnetism as in ferromagnetism to paramagnetism to diamagnetism.

10 Claims, 8 Drawing Sheets

VACUMAG MAGNETIC SEPARATOR AND PROCESS

This application claims priority from U.S. provisional patent application 60/618,402, filed Oct. 13, 2004 incorporated by reference herein.

This invention was made with Government support under Grant DMI-9983422 awarded by the National Science Foundation. The Government has certain rights in this invention.

BACKGROUND OF THE INVENTION

1. Field of the Present Invention

This invention relates to magnetic separators particularly for fine particles. More specifically, a combination of forces are used to separate dry particles of different magnetic susceptibilities. The forces include magnetic forces along with suction, blowing, or a combination of suction and blowing. The magnetic force attracts and holds the ferromagnetic and strongly paramagnetic particles to the conveying surface while the suction and/or blowing lifts the diamagnetic and weakly paramagnetic particles off of the conveying surface. Thus a separation based on the magnetic properties of the particles is accomplished and agglomerating forces are overcome.

2. Description of the Prior Art

Fly ash from coal fired power plants has been used for a variety of purposes. One of the principal uses has been as a mineral admixture in Portland cement. A factor limiting the use of some fly ashes in Portland cement is that the Loss on Ignition (LOI) of the fly ash must be below 6.0% (ASTM C618-99). Some users require even lower concentrations of LOI. Fly ashes with LOI concentrations greater than those required by the user must be separated so that a fraction of the fly ash has an LOI concentration low enough to be used as an admixture in Portland cement.

Fly ash is generally composed of carbonaceous material—the source of LOI—mullite, quartz, ferrite spinel (magnetite), and hematite as discussed by McCarthy, G. and Thedchanamoorthy, A. "Semi-Quantitative X-Ray Diffraction Analysis of Fly Ash by the Reference Intensity Ratio Method," *Fly Ash and Coal Conversion By-Products: Characterization, Utilization and Disposal V*. Materials Research Society Symposium Proceedings. 136, p. 70 (1989). Separated components of fly ash can be used for a variety of purposes. For instance, a low LOI fraction might be used for Portland cement, magnetite taken from the fly ash might be used for coal cleaning, or a low density fraction might be used in low density aggregate.

An inexpensive method for fly ash separation can create value-added products from fly ashes. The most common alternative to the beneficiation and use of fly ash is impoundment. Impoundment is an expense to power plants and can be a problem for plants with limited space. Problems of impoundment are avoided or limited by separating fly ash into value-added products, and the power plant gains a revenue source.

In the prior art, many separators exist to separate particles based on the physical and/or chemical properties of those particles. All separators depend on the existence of a physical or chemical difference between the types of particles to be separated. The more pronounced this difference is, the easier or better the separation becomes. By imposing a force (or forces) on the particles, the various types of particles will move in different directions.

In practical applications, however, the imposed force is never the only force experienced by the particles. Other forces common to nearly all particles are gravity, agglomeration due to moisture, agglomeration due to surface charges (for instance, charges acquired triboelectrically during handling), and air drag forces. Gravity is a force that is accepted, managed, and often used in separators. Air drag forces affect the fine particles more significantly than the coarse particles because of the larger surface area to volume ratio of fine particles. Likewise, surface charges result in electrostatic forces that generally affect fine particles more significantly than coarse particles. Electrostatic forces on individual particles are affected by the types of particles present, by the preparation of these particles, and by the transport of those particles. Therefore, electrostatic forces are difficult to control and use to separate a broad range of fine particles. Moisture readily collects on some particles causing them to agglomerate; however, in order for water to be a separation medium, the particles must be thoroughly wetted. If dry particles are to be recovered, the wetted particles must then be dried, adding complexity and cost to the separation process.

Magnetic susceptibility is one property of particles that can be used as a basis for separations. Particles with positive susceptibilities are paramagnetic or ferromagnetic and are attracted toward magnetic fields. Those with negative susceptibilities are diamagnetic and are repelled by magnetic fields. The magnitude of the magnetic force on paramagnetic and diamagnetic particles depends on the susceptibility of the particle, the mass of the particle, and the magnetic energy gradient which is the product of the magnetic field times its gradient. For ferromagnetic particles, the magnetic force is a product of the magnetic field gradient times the magnetic moment of the particle which is a function of the mass of the particle.

Many dry magnetic separators exist in the prior art. However, these separators are ineffective for fine particles—generally less than 10 microns as discussed by Gupta, R., Gidaspow, D., and Wasan, D. T., "Electrostatic Beneficiation of Eastern Oil Shales," *Chemical Engineering Communications*. 108, pp. 50-51 (1991).

This ineffectiveness for fine particles is a result of the adhesive forces (i.e., moisture agglomeration forces and electrostatic forces) on the particles and the small mass of fine particles resulting in small magnetic forces. Gupta, et al., determined that the separation limit of their electrostatic fine particle separator was due to agglomeration of the particles (Gupta, et al., 62). Heavilon, et al., in U.S. Pat. No. 5,513,755 also identify the agglomeration of fly ash as the limiting factor hindering its separation.

In the present invention, two primary forces are applied to the particles in order to separate them. One is a magnetic force which is strongest for the most paramagnetic and ferromagnetic particles. In addition to the magnetic force, suction, blowing, or a combination of suction and blowing is applied to the particles. Suction and blowing create gas (typically air) drag forces that are common to all particles but have the greatest effects on the finest particles. Uncontrolled forces such as electrostatic forces and agglomeration due to moisture remain; however, we have discovered that the forces of agglomeration can be overcome by using strong magnetic forces along with suction and/or blowing. Also, by reprocessing one or both of the separated fractions, additional fractions with varying magnetic susceptibilities can be removed. An example will be shown in which fly ash of 3900 µemu/(g·Oe) susceptibility was separated into high and low susceptibility fractions, and the low susceptibility fraction was again separated with a stronger magnetic field and magnetic field gradient. This process was repeated until a sample of 140 µemu/(g·Oe) was removed.

By increasing the velocity of the gas (typically air), the suction and/or blowing can dominate all other forces. By reducing the velocity, they can dominate all but the strongest remaining forces. For strongly paramagnetic and ferromagnetic particles, the magnetic force can be made to be the strongest force on these particles and, therefore, is not overcome by suction and/or blowing. In this manner, the diamagnetic and weakly paramagnetic particles are removed from the conveying surface by the gas drag and are conveyed away by the gas stream. The strongly paramagnetic and ferromagnetic particles are mechanically conveyed away from the gas drag and the magnetic mechanism where they then fall off of the conveying surface into a collection vessel. This leaves the conveying surface clean.

Separations have been successfully accomplished using gas velocities near the conveying surface of less than 10 m/s to over 140 m/s and using magnetic field strengths below 6000 gauss to more than 10,000 gauss. Particles have been separated with susceptibilities of more than 30,000 μemu/g·Oe to less than 150 μemu/g·Oe and with sizes of more than 300 microns to less than 10 microns.

SUMMARY OF THE INVENTION

A purpose of the present invention is to provide a new and improved dry separator for fine particles. The invention includes conveyance mechanisms for moving particles into and out of the separation zone. In the separation zone, the invention includes a mechanism for applying magnetic forces to the particles. In the separation zone, the invention also includes a mechanism for applying suction, blowing, or a combination of suction and blowing to the particles. The suction and/or blowing causes diamagnetic and weakly paramagnetic particles to move away from the source of the magnetic forces, disperses agglomerated particles, and mixes the particles. The separated particles are then collected in distinct locations.

A further purpose of the present invention is to separate particles on a continuous basis.

The present invention pertains to an apparatus for separating a stream of particles with individual sizes smaller than 300 μm and magnetic properties ranging from collective magnetism as in ferromagnetism to paramagnetism to diamagnetism. The apparatus comprises a plurality of stages for separating a stream of particles. The apparatus comprises a magnetic component producing a magnetic force associated with each stage. The apparatus comprises an aerodynamic component producing an aerodynamic force associated with each stage, where the more magnetic component or components of a feed of particles for each stage is separated and either or both the less magnetic product and the more magnetic product of each stage are the feed for separate succeeding stages with each stage and where the magnetic and aerodynamic forces along with gravimetric forces of each stage are chosen to separate more strongly magnetic particles from less magnetic particles.

The present invention pertains to a method for separating a stream of particles with individual sizes smaller than 300 μm and magnetic properties ranging from collective magnetism as in ferromagnetism to paramagnetism to diamagnetism. The method comprises the steps of separating a stream of particles in a plurality of stages. There is the step of producing a magnetic force associated with each stage. There is the step of producing an aerodynamic force associated with each stage, where the more magnetic component or components of a feed of particles for each stage is separated and either or both the less magnetic product and the more magnetic product of each stage are the feed for separate succeeding stages with each stage and where the magnetic and aerodynamic forces along with gravimetric forces of each stage are chosen to separate more strongly magnetic particles from less magnetic particles.

BRIEF DESCRIPTION OF DRAWINGS

Preferred embodiments of the present invention are schematically represented by FIGS. 1 through 7 which are described below.

FIG. 4 also illustrates the construction of the magnetic mechanism.

DETAILED DESCRIPTION OF THE PREFERRED EMBODIMENTS

Figure 1:
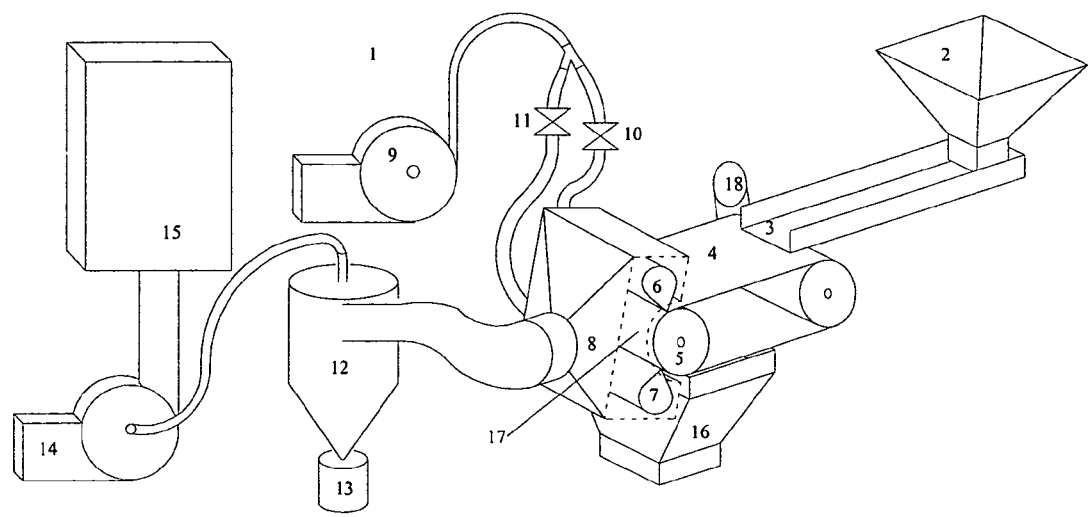
FIG. 1 is a schematic representation of a preferred embodiment of the apparatus of the present invention. It is a perspective view of the invention. This embodiment includes a conveyor belt for conveying all of the particles into the separation zone and the more magnetic particles out of the separation zone. It includes a rotating magnetic mechanism for applying magnetic forces to the particles in the separation zone. It also includes two blowing mechanisms to blow on the particles in the separation zone and a suction mechanism to remove the less magnetic particles from the separation zone.

Referring to FIG. 1, the apparatus 1 comprises a conveyor belt 4 for conveying the particles into the separation zone 17. The apparatus 1 comprises a first air knife 6 and a second air knife 7 that blow gas (typically air) onto the particles in the separation zone 17. The apparatus 1 comprises a suction hood 8 that draws in gas and particles that have been blown off of the conveyor belt 4. The apparatus 1 comprises a magnetic mechanism 5 that applies magnetic forces to the particles directed radially toward the axis of the magnetic mechanism 5 in the separation zone.

In this preferred embodiment, the particles are introduced from a hopper 2 onto a vibratory feeder 3 which feeds the particles onto the conveyor belt 4. Preferably, the feeder provides a uniform stream of particles to the conveyor belt 4 which is driven by motor 18. The conveyor belt 4 conveys the particles into the separation zone 17 where magnetic forces attract the ferromagnetic and paramagnetic particles toward the magnetic mechanism 5 and repel diamagnetic particles away from the magnetic mechanism 5.

The magnetic mechanism 5 can be chosen to apply more or less magnetic force to the particles. The magnetic force depends on the magnetic field strengths and the magnetic field gradients generated by the magnetic mechanism 5. By increasing the magnetic force, particles having lower susceptibilities will be collected with those having higher susceptibilities in collection vessel 16.

The air knives 6 and 7 serve to blow gas (typically air) onto the particles. Both air knives 6 and 7 are mounted inside the suction hood 8. In the current embodiment, air knife 6 is directed so that the gas is blown against the surface of conveyor belt 4 radial toward the center of the magnetic mechanism 5, and air knife 7 is directed so that the gas is blown against the surface of conveyor belt 4 at a 45° angle to a radius of the magnetic mechanism 5. The primary purposes of air knives 6 and 7 are to mix the particles and disperse agglomerated particles. Thus, the ferromagnetic and strongly paramagnetic particles can move as close as possible to the conveyor belt 4 where they are held, and the diamagnetic and weakly paramagnetic particles are blasted off the conveyor belt 4. Agglomerating forces between the less magnetic and the most magnetic particles are broken by the blast of gas.

Those skilled in the art will recognize that a series of pitot tubes or perforated-pipe distributors could be used in place of one or both of the air knives 6 and 7. However in our experience, air knives have been found to outperform perforated pipe distributors and groups of pitot tubes.

The gas blowing through the air knives 6 and 7 is supplied by blower 9. The distribution of gas to each air knife 6 and 7 is controlled by valves 10 and 11. By speeding up or slowing down the blower or by opening or closing valves 10 and 11, the volume rate of gas delivered to both air knives 6 and 7 increases or decreases respectively. Increasing the volume rate of gas delivered to the air knives increases the drag experienced by the particles, and particles of different susceptibilities can be separated.

The diamagnetic and weakly paramagnetic particles that are blown off of the conveyor belt 4 are drawn into the suction hood 8. It draws gas (typically air) from all around air knives 6 and 7 so that no particles escape. They are then carried downstream by the gas to the cyclone 12 where the heaviest and largest particles fall out of the gas stream and into container 13. The remaining particles are carried downstream to the baghouse 15 where they are removed from the gas stream.

The ferromagnetic and strongly paramagnetic particles that are not lifted from the conveyor belt 4 are carried out of the separation zone 17 by the conveyor belt 4. After being carried away from the magnetic mechanism 5, these particles fall off of the conveyor belt 4 and into a collection vessel 16.

Figure 2:
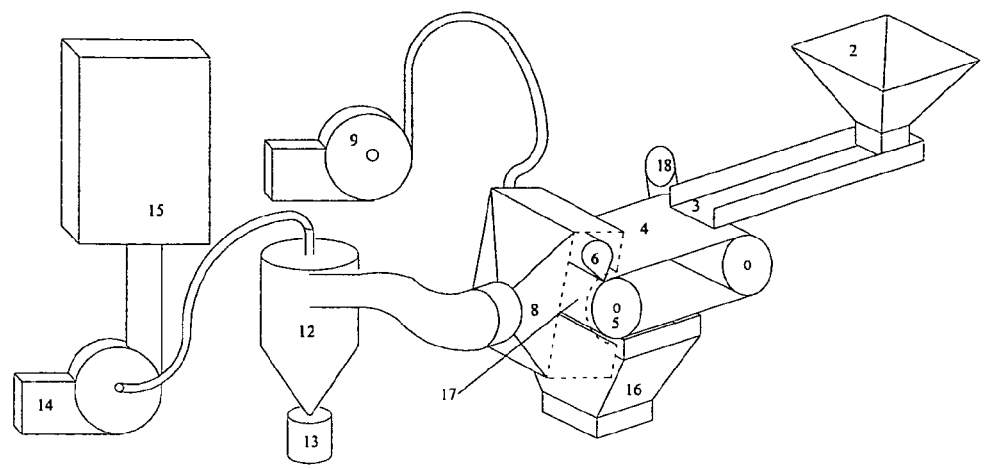
FIG. 2 is a schematic representation of a second preferred embodiment of the apparatus of the present invention. It is a perspective view of the invention. This embodiment includes the same mechanisms as embodied in FIG. 1 except that only one blowing mechanism is employed and the valves that controlled the flow to the two blowing mechanisms in FIG. 1 are not included.

Referring to FIG. 2, the second preferred embodiment is shown. It is a modification to the first preferred embodiment of FIG. 1. It uses only one air knife 6; therefore, valves 10 and 11 are unnecessary. Otherwise, this modification uses the same mechanisms as the first preferred embodiment of FIG. 1.

Blower 9 controls the gas flow to the air knife 6. By speeding up the blower, more gas velocity and gas drag are produced at the air knife 6, and by slowing down the blower, less velocity and gas drag are produced. Alternatively, the velocity and gas drag could be controlled by a valve installed in the line between the blower 9 and the air knife 6. The velocity and drag will increase as the valve is opened and decrease as it is closed.

Figure 3:
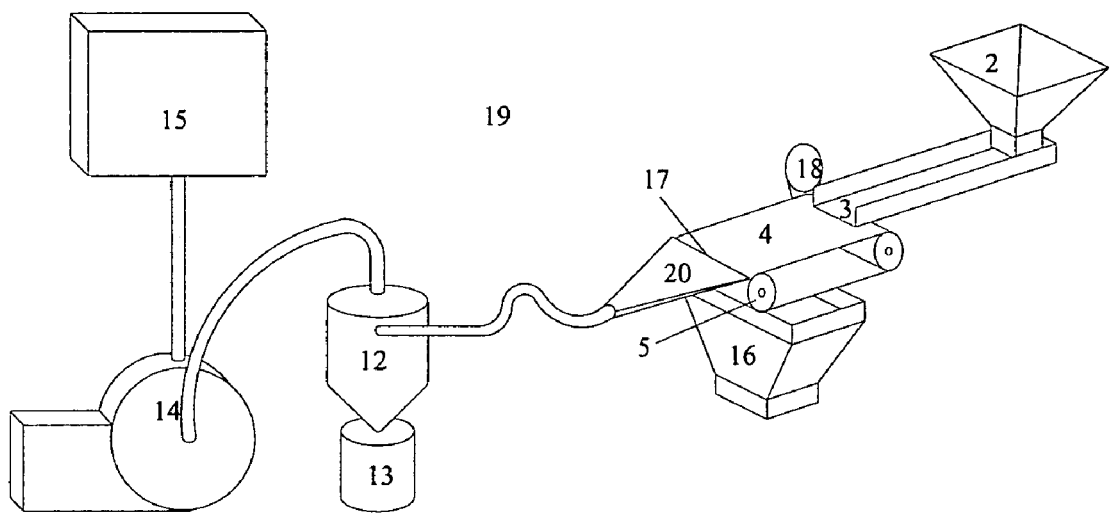
FIG. 3 is a schematic representation of a third preferred embodiment of the apparatus of the present invention. It is a perspective view of the invention. This embodiment includes a conveyor belt for conveying all of the particles into the separation zone and the more magnetic particles out of the separation zone. It includes a rotating magnetic mechanism for applying magnetic forces to the particles in the separation zone. It also includes a suction mechanism for applying suction to the particles in the separation zone and conveying the less magnetic particles away.

Referring to FIG. 3, apparatus 19 is a third preferred embodiment. A suction nozzle 20 replaces the air knives 6 and 7 and the suction hood 8 used in the first preferred embodiment. In this third preferred embodiment, blower 9 and control valves 10 and 11 are not needed. All of the force needed to lift weakly paramagnetic and diamagnetic particles is supplied by the suction of nozzle 20.

Blower 14 draws gas (typically air) into the nozzle 20. The suction increases as the blower speed increases, and it decreases as the blower speed decreases. An alternative blower control would be to install a valve in the line between the blower 14 and the nozzle 20. The suction would increase as the valve is opened and decrease as it was closed.

By adjusting the magnetic forces, the suction, or both, particles of different susceptibilities can be separated. In the separation zone 17, suction opposes the magnetic forces. Diamagnetic and weakly paramagnetic particles are not sufficiently attracted toward the magnetic mechanism 5, and therefore, they are lifted from the conveyor belt 4 and into the nozzle 20. The ferromagnetic and strongly paramagnetic particles are not lifted and are carried out of the separation zone 17 and away from the magnetic mechanism 5 by the conveyor belt 4. These particles then fall off of the conveyor belt 4 and into a collection vessel 16.

The gas (typically air) conveys the diamagnetic and weakly paramagnetic particles to the cyclone 12 where the heaviest and largest particles fall out of the gas stream and into container 13. The remaining particles are carried to the baghouse 15 where they are removed from the gas stream.

Figure 4:
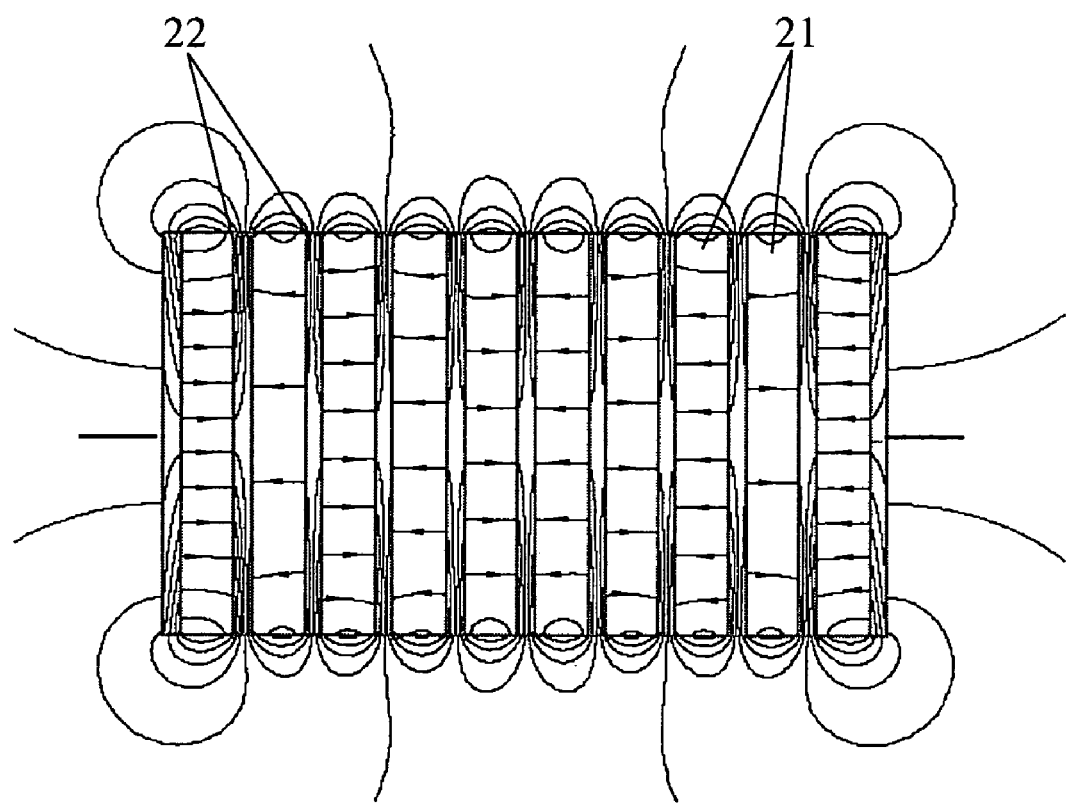
FIG. 4 shows the magnetic flux lines in and around the magnetic mechanism used in the preferred embodiments.

Referring to FIG. 4, the magnetic mechanism 5 consists of permanent magnets 21 (preferably rare earth magnets) and magnetic steel spacers 22 on a common horizontal axis. Each magnet 21 and spacer 22 is shaped as an annulus. Between each magnet 21 is a spacer 22. In the current embodiments, the magnets are 0.2 inches thick, and the spacers are 0.063 inches thick. The center hole in each magnet 21 and spacer 22 is used for mounting on an axis. The magnets 21 are magnetized along their axes, and the direction of magnetization is opposite for neighboring magnets 21. This embodiment creates large magnetic energy gradients at the surface of the magnetic mechanism 5. Also, magnetic lines of flux are shown emanating from the magnetic mechanism 5. This magnetic structure exists in the prior art without the suction and blowing mechanisms (Dauchez, U.S. Pat. No. 5,051,177).

Figure 5:
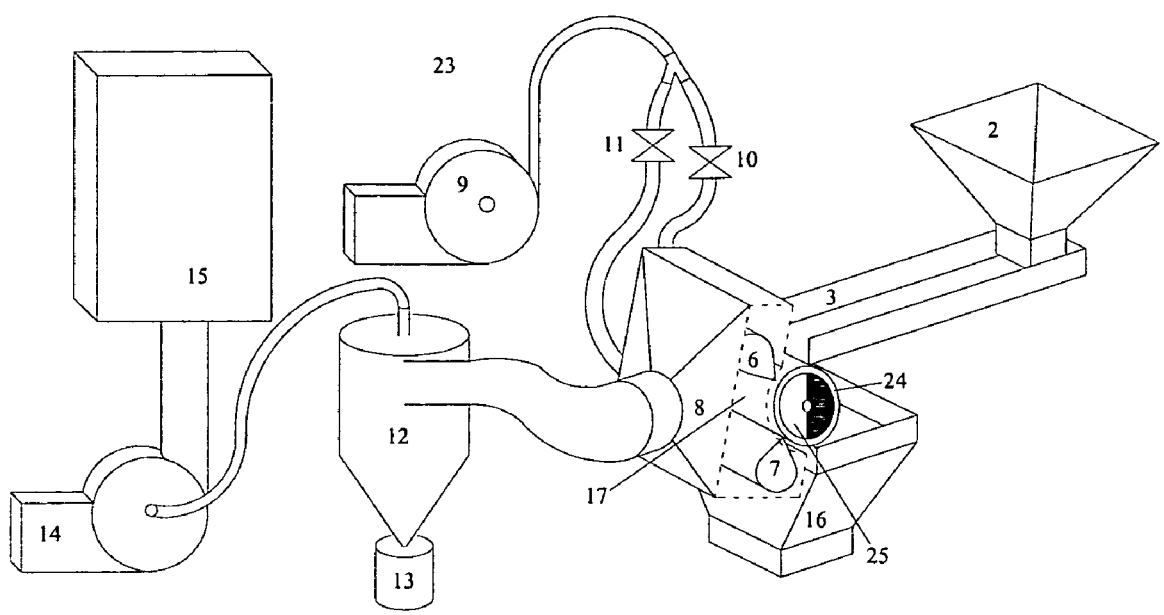
FIG. 5 is a schematic representation of a fourth embodiment of the apparatus of the present invention. It is a perspective view of the invention. This embodiment is a modified drum separator. It includes a rotating shell for conveying all of the particles into the separation zone and the more magnetic particles out of the separation zone. It includes a stationary magnetic mechanism for applying magnetic forces to the particles in the separation zone. It also includes two blowing mechanisms to blow on the particles in the separation zone, and a suction mechanism to remove the less magnetic particles from the separation zone.

Referring to FIG. 5, in a fourth preferred embodiment, apparatus 23 includes a conveying mechanism 3 that receives particles from hopper 2 and conveys the particles to a rotating shell 24. The rotating shell 24 rotates about the stationary magnet mechanism 25 and conveys the particles into the separation zone 17. The magnet mechanism 25 applies magnetic forces to particles in the separation zone 17. There the diamagnetic and weakly paramagnetic particles are blown off the rotating shell 24 by the air knives 6 and 7 and into the hood 8. Blower 9 and valves 10 and 11 control the volume rate of gas supplied to the air knives 6 and 7. Blower 14 supplies the suction to hood 8. The rotating shell 24 conveys the remaining strongly paramagnetic and ferromagnetic particles out of the separation zone. Once the rotating shell 24 carries the particles past the magnetic mechanism, they fall off into a collection vessel 16. The particles that enter the hood 8 are carried downstream by the gas to the cyclone 12 where the heaviest and largest particles fall out of the gas stream and into container 13. The rest of the particles are carried downstream to the baghouse 15 where they are removed from the gas stream. This embodiment is a modified drum separator in which the hood 8 and the air knives 6 and 7 distinguish it from the prior art (Yashima, et al., U.S. Pat. No. 3,856,666, which describes a drum separator).

One modification to the fourth preferred embodiment is the use of only one air knife 6 such as in FIG. 2. If only one air knife 6 is used, valves 10 and 11 are unnecessary. The blower 9 can be used to control the gas velocity and drag at the air knife 6.

Another modification to the fourth preferred embodiment is the use of a suction nozzle (such as suction nozzle 20 in FIG. 3) in place of the air knives 6 and 7 and the hood 8. In this modification, blower 9 and valves 10 and 11 are unnecessary. Blower 14 would supply suction to the nozzle.

Figure 6:
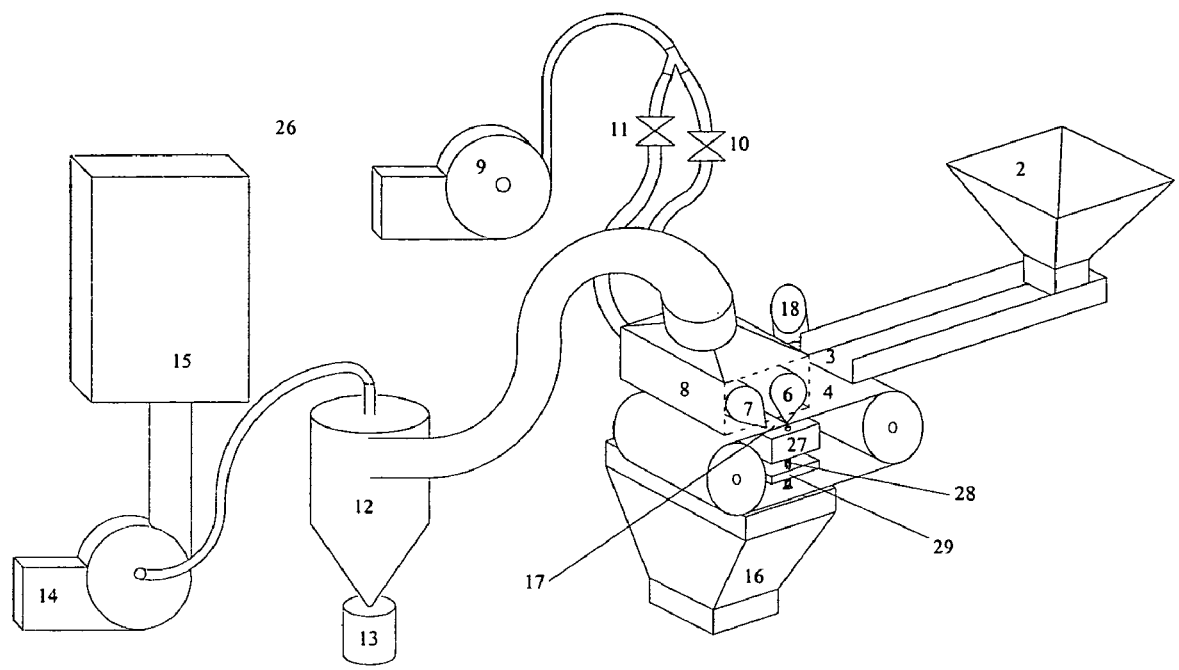
FIG. 6 is a schematic representation of a fifth embodiment of the apparatus of the present invention. It is a perspective view of the invention. This embodiment includes a conveyor belt for conveying particles into and out of the separation zone. It includes a magnetic mechanism located below the belt and between the rolls guiding the belt. It also includes two blowing mechanisms to blow on the particles in the separation zone, and a suction mechanism to remove the less magnetic particles from the separation zone.

Referring to FIG. 6, in a fifth embodiment, apparatus 26 includes a conveying mechanism 4 that receives particles from hopper 2 and conveys the particles to the separation zone 17. Magnetic mechanism 27 applies magnetic force to the particles in the separation zone 17, and air knives 6 and 7 apply gas drag to the particles in the separation zone 17. Strongly paramagnetic and ferromagnetic particles are retained on the conveying mechanism 4 by the magnetic force. Weakly paramagnetic and diamagnetic particles are blown off of the conveying mechanism 4 and collected by the suction hood 8. Blower 9 and valves 10 and 11 control the volume rate of gas supplied to the air knives 6 and 7. Blower 14 supplies the suction to hood 8. The conveying mechanism 4 conveys the retained strongly paramagnetic and ferromagnetic particles out of the separation zone. Once the conveying mechanism 4 carries the particles past the magnetic mechanism, they are conveyed to the end of the conveying mechanism 4 where they fall off into a collection vessel 16. The particles that enter the hood 8 are carried downstream by the gas to the cyclone 12 where the heaviest and largest particles fall out of the gas stream and into container 13. The rest of the particles are carried downstream to the baghouse 15 where they are removed from the gas stream.

The fifth preferred embodiment also includes an adjustment mechanism (screw 28 and support 29) to adjust the position of the magnetic mechanism 27 relative to the conveying mechanism 4. In this way, the magnetic force experienced by the particles can be increased (position the magnetic mechanism 27 closer to the conveying mechanism 4 by turning screw 28 in) or decreased (position the magnetic mechanism 27 farther from the conveying mechanism 4 by turning screw 28 out). In practice, it is anticipated that a second screw like screw 28 would be attached to the opposite side of the magnetic mechanism 27 and the support 29 in order to adjust both sides of the magnetic mechanism 27. Also, if adjusting the magnetic mechanism 27 is deemed unnecessary, the adjustment mechanism would not have to be installed.

A modification to the fifth preferred embodiment is the use of only one air knife 6 such as in FIG. 2. If only one air knife 6 is used, valves 10 and 11 are unnecessary. The blower 9 can be used to control the gas velocity and drag at the air knife 6.

Another third modification to the fifth preferred embodiment is the use of a suction nozzle (such as suction nozzle 20 in FIG. 3) in place of the air knives 6 and 7 and the hood 8. In this modification, blower 9 and valves 10 and 11 are unnecessary. Blower 14 would supply suction to the nozzle.

Figure 7:
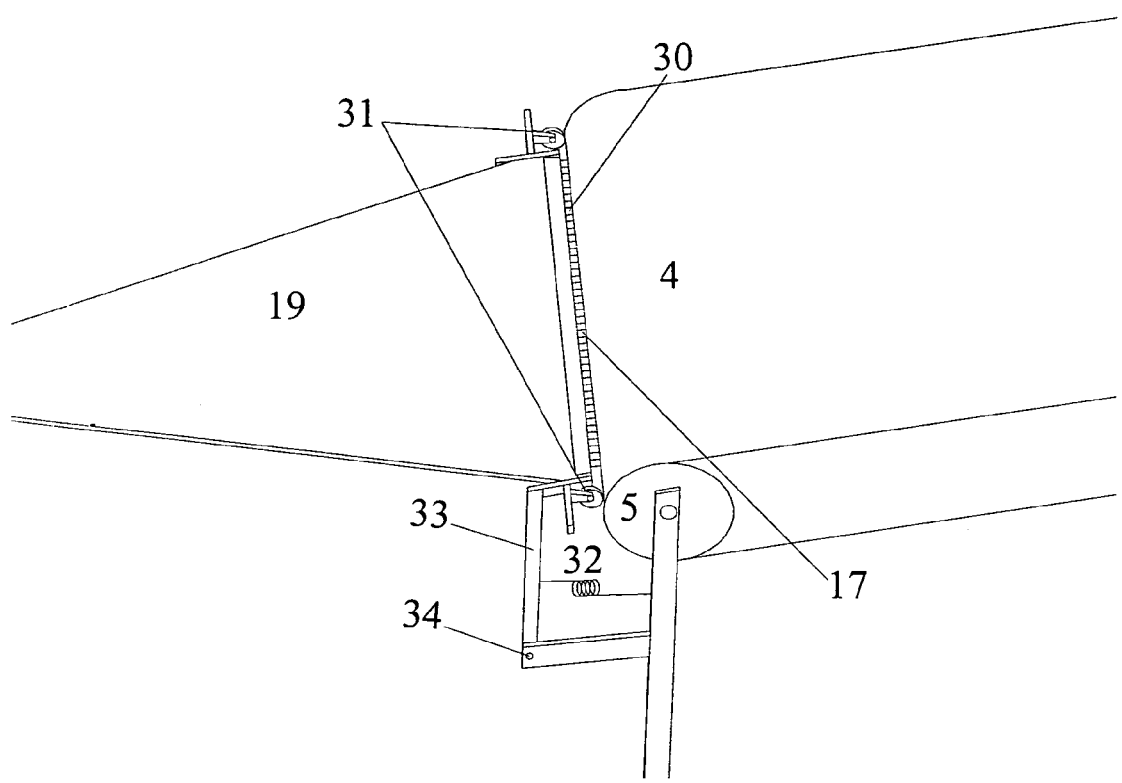
FIG. 7 is a schematic representation of the separation zone with various modifications to the apparatus shown in FIG. 3. It is a perspective view. The modifications include a wheeled mechanism for maintaining the suction nozzle at a fixed distance from the conveying mechanism and a brush for mixing the particles in the separation zone.

Referring to FIG. 7, some modifications (described below) to the apparatus 19 of FIG. 3 have been successfully tested. The first modification is the addition of a brush 30 on the leading edge of suction nozzle 20. The brush 30 is in contact with the conveyor belt 4 and mixes the particles as they enter the separation zone 17. This or any other device (i.e., an air injection system) that mixes the particles as they enter the separation zone improves the separations.

A second modification is the addition of nozzle spacing mechanisms 31. The spacing mechanisms 31 consist of wheels mounted to nozzle 20. The spacing mechanisms 31 keep the suction nozzle 20 at a fixed distance above the conveyor belt 4. Spring 32 applies pressure to the support structure 33 which can rotate about pivot point 34. This pressure keeps the wheels 31 in contact with the conveyor belt 4. Typically, a second spring like 32, a second support structure like 33, and a second pivot point like 34 would be used on the other side of nozzle 20 to maintain contact between the wheels 31 and the conveyor belt 4.

Figure 8:
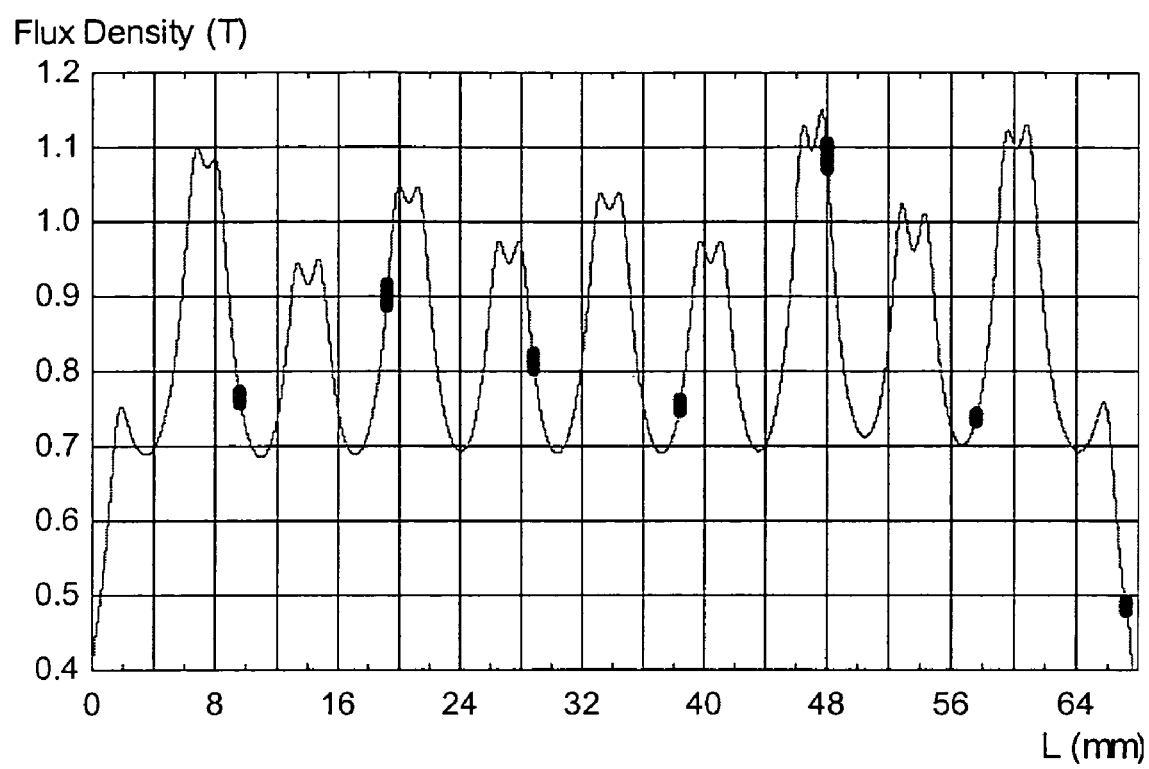
FIG. 8 is a graph of the magnetic field strength as a function of location parallel to the axis of the magnetic mechanism and 0.6 mm above its surface.

Referring to FIG. 8, the modeled magnetic field strength is plotted along a line parallel to the axis of the magnetic mechanism 5. The line is 0.6 mm above the surface of the magnetic mechanism 5. The double peaks occur above the steel spacers 22.

EXAMPLES

In the following examples, gas drag forces were used to mix particles, disperse agglomerates, and remove diamagnetic and weakly paramagnetic particles from the conveyor belt. In other tests without the gas drag forces, a layer of fly ash collected on the belt up to 2 mm thick and did not fall off even after passing beneath the magnetic mechanism. The agglomerating forces and attractive forces to the belt were stronger than gravity and centrifugal forces that would pull the particles off of the belt. However, in none of the examples cited below which incorporated gas drag forces did a significant mass of particles stick to the belt. The less magnetic fractions were lifted off the belt and carried away by the gas stream, and the magnetic fractions were carried to the bottom of the magnetic mechanism by the belt where they fell off.

Three dry (less than 0.3% moisture) samples of fly ash from an Eastern U.S. pulverized coal fired power plant were separated using a separator as shown in FIG. 3. In one test, a suction of 10 inches of water was applied to the vacuum nozzle with the magnetic mechanism in place; in another test, no suction was applied to the vacuum nozzle with the magnetic mechanism in place; and in the final test, a suction of 10 inches of water was applied to the suction nozzle with no magnetic mechanism. The magnetic mechanism was 4 inches in diameter, and in the final test, it was replaced with an aluminum roll that was 2 inches in diameter. The fly ash was fed at a rate of approximately 3 pounds/hour, and the particle bed width was 1.5 inches. The magnetic mechanism and the aluminum roll were turning at 50 rpm. The belt used for the tests with the magnetic mechanism was 30 thousandths of an inch thick and made of silicon coated fabric; the belt used for the test without the magnetic mechanism was 5 thousandths of an inch thick and made of Teflon coated fiberglass. For the tests that included suction, the vacuum nozzle was positioned 2 mm above the belt's surface. Table I lists the results.

TABLE I

Separations with and without Suction

| | Recovery (Wt. %) | Loss-On-Ignition (Wt. %) |
|---|---|---|
| Feed | 100 | 10.1 |
| Fraction Retained on the Belt with Suction & Magnetic Mechanism | 7.7 | 0.4 |
| Fraction Retained on the Belt without Suction & with Magnetic Mechanism | 96.8 | 9.8 |
| Fraction Retained on the Belt with Suction & without Magnetic Mechanism | 0 | — |

Obviously, the gas drag force and the magnetic force are necessary in order to separate the fly ash. Without the magnetic force, all of the material is lifted and carried away by the suction. Without the air drag force, virtually all of the material is retained on the belt; in fact, some of the material will not fall off of the belt without assistance. Therefore, a brush was mounted at the rear roll that guides the belt to remove any material that stuck to the belt. Any material that was brushed off was collected with the "Fraction Retained on the Belt". The brush was left on for all of these tests even when it was not necessary.

Other fly ash samples from the same power plant were separated using a separator as shown in FIG. 1. These samples contained 1.9% moisture. The fly ash was fed at a rate of 2000 pounds/hour with a particle bed width of 10.5 inches. The magnetic mechanism was 6 inches in diameter and turned at 300 rpm. The belt was 25 thousandths of an inch (0.6 mm) thick and was made of a silicon coated fabric. The gas velocity from each air knife was approximately 30,000 fpm. Air was blown through the first air knife and nitrogen was blown through the second air knife. From FIG. 7, the peaks in the magnetic field strength occur above the edges of the spacers and are in excess of 0.9 T. No brush was used during these tests.

Table II compares the feed material with the separated magnetic fractions. It also compares the magnetic fractions generated using both air knives with those generated using only the second air knife. The fractions that the gas blew off the belt (95-96% of the feed) are not included because approximately 24% of these fractions blew through both the cyclone and baghouse intended to collect them and were not recovered.

TABLE II

Comparison of Fly Ash Feed and Magnetic Fractions

| | Recovery (Wt %) | Loss-On-Ignition (Wt %) | Susceptibility (μemu/g · Oe) |
|---|---|---|---|
| Feed | 100 | 13 | 2100 |
| Magnetic Fraction - 1 air knife | 5.1 | 4.0 | 25,000 |
| Magnetic Fraction - 2 air knives | 4.0 | 2.3 | 32,000 |

As would be expected, the magnetic fractions have much higher susceptibilities than the feed. Both of the magnetic fractions contained similar weight percents; however, the fraction separated with one air knife had a lower susceptibility. This shows that the separator was effective on the fly ash and that using both air knives results in a better separation (the magnetic fraction contains less weakly magnetic material) than using only one.

The LOI of each magnetic fraction is less than or equal to 4% which is much less than that of the feed. Therefore, the majority of the LOI is in the less magnetic fractions, and the magnetic fractions could be used as an admixture in Portland cement. Also, the LOI of the magnetic fraction separated with both air knives is significantly lower than that separated with only one air knife.

Table III compares the quantity of fine material in the feed and the magnetic fractions.

TABLE III

Quantity of Fine Material from the Feed and Magnetic Fractions

| | Quantity <8μ (Volume %) | Quantity <10μ (Weight %) |
|---|---|---|
| Feed | 15 | 39 |
| Magnetic Fraction - 1 air knife | 13 | 22 |
| Magnetic Fraction - 2 air knives | 10 | 20 |

The magnetic fractions contained less fine material than the feed when measured by volume and by weight. The magnetic fraction separated with two air knives contained less fine material than that separated with one air knife. Table IV compares the LOI and susceptibilities of the material finer than 10μ.

TABLE IV

Comparison of <10μ Samples from Feed and Magnetic Fractions

| | Quantity <10μ (Wt %) | Loss-On-Ignition (Wt %) | Susceptibility (μemu/g · Oe) |
|---|---|---|---|
| Feed | 39 | 4.6 | 963 |
| Magnetic Fraction - 1 air knife | 22 | 4.8 | 3500 |
| Magnetic Fraction - 2 air knives | 20 | 3.9 | 7809 |

As shown above, the feed contained more fine material than the magnetic fractions. The less than 10μ fractions also demonstrate that the feed had a lower susceptibility than the magnetic fractions. Therefore, the separator effectively separated material less than 10μ. When two air knives are used, the susceptibility of the finer material is higher than that separated using only one air knife indicating that less weakly magnetic fine material is contained in the magnetic fraction separated with both air knives.

Because LOI determinations are no more accurate than ±0.1% (ASTM procedure C311-98b), the LOI difference is not significant between that of the fine feed material and the fine magnetic fraction when only one air knife was used. However, the LOI of the fine material separated with both air knives is significantly lower than that of the fine feed material and that of the fine material separated with only one air knife. Therefore, using both air knives resulted in a more complete separation of fine LOI material than using only one air knife.

In the previous examples, the fly ash contained less than 2% moisture. If the particles to be separated contain more moisture, the gas injected through the air knives could be heated in order to dry the particles in the separation zone.

In another test, fly ash from the same power plant was separated using a separator similar to that in FIG. 3. The fly ash was fed at a rate of 4 pounds/hour, and the particle bed width was 1.5 inches. The magnetic mechanism diameter was 4 inches and was turning at 48 rpm. The belt thickness was 30 thousandths of an inch, and the belt was made of a silicon coated fabric. A suction of approximately 10 inches of water was drawn through the nozzle which was positioned 3 mm above the belt's surface. Table V compares the feed material with the magnetic and nonmagnetic fractions separated from the feed. The percent of the feed weight that was recovered, the LOI, and the susceptibility are tabulated and compared to the feed for each fraction. The volume percent that was less than 8µ is tabulated for the feed and magnetic fractions only.

TABLE V

Comparison of Fly Ash Feed and Separated Fractions

| | Recovery (Wt %) | Loss-On-Ignition (Wt %) | Susceptibility (µ emu/g · Oe) | Quantity <8µ (Vol %) |
|---|---|---|---|---|
| Feed | 100 | 13 | 2700 | 7 |
| Magnetic Fraction | 13.9 | 0.80 | 20,000 | 4 |
| Nonmagnetic Fraction | 81.8 | 16 | 430 | |

Note that 4 Wt % of the feed material was lost during the separation. The lost material is fine material that blew through the cyclone used to collect the material carried by the gas stream. This lost material was from the nonmagnetic fraction, and would distort a measure of the volume percent less than 8µ this fraction.

Again the magnetic fraction has the lowest LOI, highest susceptibility, and lowest volume percent of material finer than 8µ. Unlike the feed, the magnetic fraction could be used as a mineral admixture in Portland cement.

A series of tests were performed on a fly ash sample from a Southern U.S. pulverized coal fired power plant. A separator similar to that shown in FIG. 3 was used. Following each separation, the magnetic field and magnetic field gradient penetrating the particle bed were increased by decreasing the distance between the magnetic mechanism and the particle bed, and the material that was not captured by the magnetic mechanism was reprocessed. In order to achieve distances greater than 0.8 mm, duct tape was wrapped on the magnetic mechanism. Each distance recorded in Table VI includes the belt thickness plus the tape thickness. A 0.8 mm thick silicon coated fabric belt was used for distances equal to or greater than 0.8 mm. A 0.1 mm thick Teflon coated fiberglass belt was used for the 0.1 mm distance. The feed rate for each separation was approximately 4 pounds/hour, and the particle bed width was 1.5 inches. The magnetic mechanism diameter was 4 inches and was turning at approximately 50 rpm. A suction of approximately 10 inches of water was drawn through the nozzle. Table VI compares the fractions removed from the fly ash in this series of tests. The recovery is the percent of the original feed sample that was recovered in each fraction. The "Magnetic Fractions" are those that were captured by the magnetic mechanism. The "Least Magnetic Fraction" is the fraction from the final separation test that was not captured by the magnetic mechanism.

TABLE VI

Comparison of Repeatedly Separated Fractions

| | Distance (mm) | Recovery (Wt %) | Loss-On-Ignition (Wt %) | Susceptibility (µ emu/g · Oe) |
|---|---|---|---|---|
| Feed | | 100 | 6.5 | 3900 |
| 1'st Magnetic Fraction | 3.8 | 17.2 | 0.3 | 16000 |
| 2'nd Magnetic Fraction | 1.8 | 3.4 | 0.0 | 16000 |
| 3'rd Magnetic Fraction | 0.8 | 1.5 | 0.8 | 10000 |
| 4'th Magnetic Fraction | 0.1 | 8.7 | 1.9 | 3000 |
| Least Magnetic Fraction | 0.1 | 59.7 | 11.7 | 140 |

The overall recovery from these tests was 90.5%. The lost material was fine and escaped through the cyclone used to collect the particles carried by the gas stream.

The susceptibility of the magnetic fractions generally decreases with each subsequent test. The LOI is less than that of the feed for all of the magnetic fractions and is higher for the "Least Magnetic Fraction." A total of 30.7 Wt % of the feed was recovered at a 0.7% LOI if all of the magnetic fractions were combined and could be used in Portland cement. These tests demonstrated that material with a susceptibility of 140 µemu/g·Oe can be separated from a stream also containing much more magnetic material.

This same fly ash from the Southern U.S. pulverized coal fired power plant was separated in another test using a distance of 3.6 mm between the particle bed and the magnetic mechanism. The feed rate for each separation was approximately 6 pounds/hour, and the particle bed width was 1.5 inches. The magnetic mechanism diameter was 4 inches and was turning at 49 rpm. The belt was a silicon coated fabric. A suction of approximately 7 inches of water was drawn through the nozzle. Table VII lists the results of this separation including the specific gravities of the fractions. The quantity of magnetic material was insufficient to make a specific gravity measurement.

TABLE VII

Separations Data Including Specific Gravity

| | Recovery (Wt %) | Loss-On-Ignition (Wt %) | Specific Gravity |
|---|---|---|---|
| Feed | 100 | 6.5 | 2.39 |
| Nonmagnetic Fraction | 70.4 | 8.4 | 2.14 |
| Magnetic Fraction | 26.6 | 1.1 | |

Note that 3% of the material was lost. Again this was fine material that passed through the cyclone used to collect the nonmagnetic fraction.

The specific gravity of the nonmagnetic fraction is significantly reduced by the separation. Low density aggregate applications use fly ashes with specific gravities equal to or less than 2.20. Although the feed in Table VII could not be used in low density aggregate, the nonmagnetic fraction can. The magnetic fraction is low in LOI and could be used as a mineral admixture in Portland cement.

A two stage separation test to generate three products was performed on fly ash from another Southern U.S. coal fired power plant: a low specific gravity fraction, a less than 4% LOI fraction, and a fly ash derived magnetite. The throughput to the first separation stage was 2910 pounds/Hr. Both air knives were used with gas speeds of 30,000 fpm. Air was blown through the first air knife and nitrogen was blown through the second air knife. The 5 mil thick (0.13 mm) Teflon coated fiberglass belt was used with no tape on the roll. The roll speed was 500 rpm, and the bed width was 9.5 inches.

The most magnetic fraction (the fraction not blown off of the belt by the gas) was separated again in a second separation stage. The throughput to the second stage was 460 pounds/Hr. The air knives were operated with the same gases and speeds. The belt was changed to the 30 mil (0.6 mm) silicon coated fabric belt. No tape was wrapped on the roll which spun at 400 rpm. The bed width was the same.

Table VIII illustrates the results of this two stage separation. Although some of the "Low Specific Gravity" and "Less Than 4% LOI" fractions were lost during the separations (the lost material blew through the cyclone and the baghouse), their recoveries, LOI's, and specific gravities could be calculated, and the relevant numbers are recorded. All of these products could be recovered and used commercially.

TABLE VIII

Two Stage Separation Results

| Sample | Recovery (Wt %) | Loss-On-Ignition (Wt %) | Specific Gravity |
|---|---|---|---|
| Low Specific Gravity | 87.7 | 6.7 | 2.17 |
| Less Than 4% LOI | 9.5 | 3.8 | |
| Magnetite | 2.7 | −0.6 | |

The invention claimed is:

1. An apparatus for separating a stream of particles with individual sizes smaller than 300 μm and magnetic properties ranging from collective magnetism as in ferromagnetism to paramagnetism to diamagnetism comprising:
   a plurality of stages for separating a stream of particles with individual sizes smaller than 300 μm;
   a conveying mechanism for conveying the particles;
   a magnetic component producing a magnetic force associated with each stage;
   an aerodynamic component producing an aerodynamic force associated with each stage, where the more magnetic component or components of a feed of particles for each stage is separated and either or both the less magnetic product and the more magnetic product of each stage are the feed for separate succeeding stages with each stage and where the magnetic and aerodynamic forces along with gravimetric forces of each stage are chosen to separate more strongly magnetic particles from less magnetic particles, where gravity is used to collect the more strongly magnetic particles, the aerodynamic component including a first gas nozzle disposed above the conveying mechanism and directing gas at the magnetic component, and a second gas nozzle disposed below the conveying mechanism and directing gas at the magnetic component; and
   a suction nozzle which draws in the less magnetic particles.

2. An apparatus as described in claim 1 wherein the magnetic and aerodynamic forces along with gravimetric forces separate more magnetic particles from a stream of less magnetic particles.

3. An apparatus as described in claim 2 wherein the conveying mechanism includes a non-metallic and non-magnetic conveyor belt with thicknesses ranging up to 8 mm.

4. An apparatus as described in claim 3 wherein the conveyor belt includes a roller.

5. An apparatus as described in claim 4 wherein the magnetic component includes a magnetic separator mechanism employing magnets located in the roller at one end of the belt, underneath and along the length of the belt on the opposite side of the belt carrying the particles, or both.

6. An apparatus as described in claim 5 wherein the aerodynamic component includes a suction nozzle positioned less than 25 mm away from the conveyor belt surface on the side of the conveyor belt surface opposite the magnetic component and which draws gas from above and around the particles at a rate greater than 0.1 m/s.

7. An apparatus as described in claim 6 wherein the aerodynamic component includes a hood enclosing the gas injection nozzles and a separation zone at the end of the conveyor belt surface on the side of the conveyor belt surface opposite the magnetic component and which draws gas from above and around the particles at a volume rate of flow equal to or greater than that issued by the injection nozzles.

8. An apparatus as described in claim 7 including a positioning mechanism used to maintain the suction nozzle at a fixed distance of less than 25 mm from the conveyor belt surface and a brush is mounted to the leading edge of the suction nozzle in order to mix the particles in order to improve the separation.

9. An apparatus as described in claim 8 wherein the rate of injecting gas can be controlled and the rate of suction through the suction nozzle and hood can be controlled.

10. An apparatus as described in claim 9 including a system for removing particles from the gas is installed in a suction line downstream of the suction nozzle and hood.

* * * * *